US012792086B2

(12) United States Patent
Lu

(10) Patent No.: US 12,792,086 B2
(45) Date of Patent: Nov. 10, 2026

(54) CASING ASSEMBLY

(71) Applicant: Acer Incorporated, New Taipei City (TW)

(72) Inventor: Ching-Yi Lu, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 461 days.

(21) Appl. No.: 18/526,159

(22) Filed: Dec. 1, 2023

(65) Prior Publication Data

US 2024/0281024 A1 Aug. 22, 2024

(30) Foreign Application Priority Data

Feb. 17, 2023 (TW) ................................ 112105779

(51) Int. Cl.
*G06F 1/16* (2006.01)

(52) U.S. Cl.
CPC .................................. *G06F 1/1601* (2013.01)

(58) Field of Classification Search
CPC .... H05K 5/0217; H05K 5/0221; H05K 5/023; H05K 5/0226; F16M 11/041; G06F 1/1601; G06F 1/181
See application file for complete search history.

(56) References Cited

U.S. PATENT DOCUMENTS 5,566,048 A * 10/1996 Esterberg .............. G06F 1/1681 16/342
7,342,778 B2 * 3/2008 Fan ......................... G06F 1/166 361/679.55
7,342,798 B2 * 3/2008 Chen ....................... G06F 1/181 361/679.55
2006/0196120 A1 * 9/2006 Yamada ................... H02B 1/38 49/193
2007/0210684 A1 * 9/2007 Lin ......................... G06F 1/181 312/223.2
2008/0143218 A1 * 6/2008 Alayev .............. A47B 21/0073 312/1
2010/0223755 A1 * 9/2010 Liu ..................... H04M 1/0216 16/250

(Continued)

FOREIGN PATENT DOCUMENTS

CN 109089396 A * 12/2018 ........... H05K 5/0221
CN 109287086 A 1/2019

(Continued)

OTHER PUBLICATIONS

Translation CN109287086A, 7 pages (Year: 2019).*

*Primary Examiner* — Andrew Roersma
(74) *Attorney, Agent, or Firm* — Birch, Stewart, Kolasch & Birch, LLP

(57) ABSTRACT

A casing assembly is provided in this disclosure. The casing assembly comprises a bezel body, a movable component and two collar components. The bezel body includes at least one pair of hole structures. The movable component has a shaft portion. The two collar components are mounted on two opposite ends of the shaft portion. The shape of the two collar components is adapted to that of at least one pair of hole structures. The movable component is pivotally arranged in at least one pair of hole structures through the two collar components. The movable component and the two collar components are made of different materials.

8 Claims, 6 Drawing Sheets

(56) References Cited

U.S. PATENT DOCUMENTS

| | | | | |
|---|---|---|---|---|
| 2011/0317345 | A1* | 12/2011 | Huang | G06F 1/1613 361/679.01 |
| 2013/0021726 | A1* | 1/2013 | Yang | H04M 1/0216 361/679.01 |
| 2014/0001942 | A1* | 1/2014 | Mao | H05K 7/1487 312/333 |
| 2014/0375196 | A1* | 12/2014 | Nguyen | E05D 15/507 29/592 |
| 2015/0021933 | A1* | 1/2015 | Shin | B60N 3/023 292/336.3 |
| 2015/0201723 | A1* | 7/2015 | Rayner | F16M 11/10 224/191 |
| 2019/0316392 | A1* | 10/2019 | Sun | H05K 5/0221 |
| 2019/0394893 | A1* | 12/2019 | Wu | H05K 5/023 |
| 2020/0267857 | A1* | 8/2020 | Xiao | H05K 5/0226 |
| 2021/0199234 | A1* | 7/2021 | Huang | F16M 11/041 |
| 2021/0368639 | A1* | 11/2021 | Lu | H05K 7/1487 |
| 2022/0346244 | A1* | 10/2022 | Lu | H05K 5/023 |
| 2024/0147643 | A1* | 5/2024 | Maclean | E05B 79/20 |

FOREIGN PATENT DOCUMENTS

| | | | | |
|---|---|---|---|---|
| CN | 212034525 U | * 11/2020 | | H05K 5/0226 |
| CN | 114980606 A | * 8/2022 | | H02J 7/70 |
| KR | 200180209 Y1 | * 5/2000 | | F16M 11/10 |

* cited by examiner

CASING ASSEMBLY

This application claims the benefit of Taiwan application Serial No. 112105779, filed Feb. 17, 2023, the subject matter of which is incorporated herein by reference.

TECHNICAL FIELD

The invention relates in general to a casing assembly, and more particularly to a casing assembly with a pivotal structure.

BACKGROUND

Generally, when two elements made of different materials are respectively used as a rotation shaft and a rotation shaft hole then are assembled together, after a period of use with repeated rotation or sliding, hardness difference between the two elements will cause wearing and tearing, the shaft hole matching structure will become eccentric, and smoothness of rotation will deteriorate.

Therefore, how to resolve the above problems has become an important direction to the personnel in the technology field of the present disclosure.

SUMMARY

The invention is directed to a casing assembly, in which two collar components are mounted on the movable component and are used as a bushing between the movable component and the hole structures, so that the movable component and the hole structures are separated, and direct friction, which would otherwise cause damage or generate noises, can be avoided. The material of the movable component is different from that of the hole structures.

According to one embodiment of the present invention, a casing assembly is provided. The casing assembly comprises a bezel body, a movable component and two collar components. The bezel body includes at least one pair of hole structures. The movable component has a shaft portion. The two collar components are mounted on two opposite ends of the shaft portion. The shape of the two collar components is adapted to that of at least one pair of hole structures. The movable component is pivotally arranged in at least one pair of hole structures through the two collar components. The movable component and the two collar components are made of different materials.

The above and other aspects of the invention will become better understood with regard to the following detailed description of the preferred but non-limiting embodiment(s). The following description is made with reference to the accompanying drawings.

DETAILED DESCRIPTION

Detailed descriptions of each embodiment of the present invention are disclosed below with reference to accompanying drawings. Apart from the said detailed descriptions, any embodiment in which the present invention can be used as well as any substitutions, modifications or equivalent changes of the said embodiments are within the scope of the present invention, and the descriptions and definitions in the claims shall prevail. Specific details and embodiments are disclosed in the specification for anyone ordinary skilled in the art to comprehensively understand the present invention, not for limiting the present invention. Moreover, generally known procedures or elements are not disclosed to avoid adding unnecessary restrictions to the present invention. Unless otherwise specified, element designations common to different drawings can be regarded as corresponding elements. These drawings are for describing the connection relationship between the elements of the embodiments, and the dimension scales used in the accompanying drawings are not based on actual proportion of the elements.

Figure 1A:
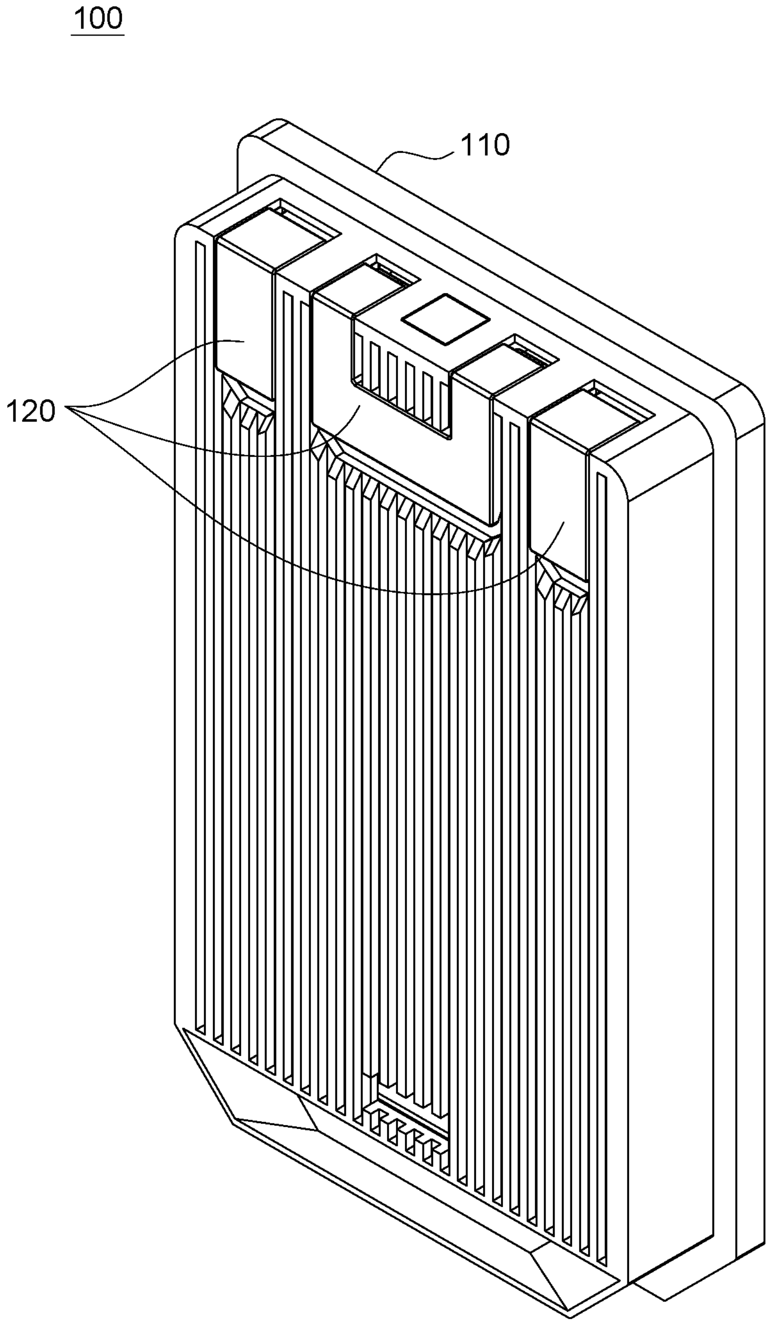
FIG. 1A to FIG. 1C are schematic diagrams of a casing assembly according to an embodiment of the present disclosure.
Figure 1B:
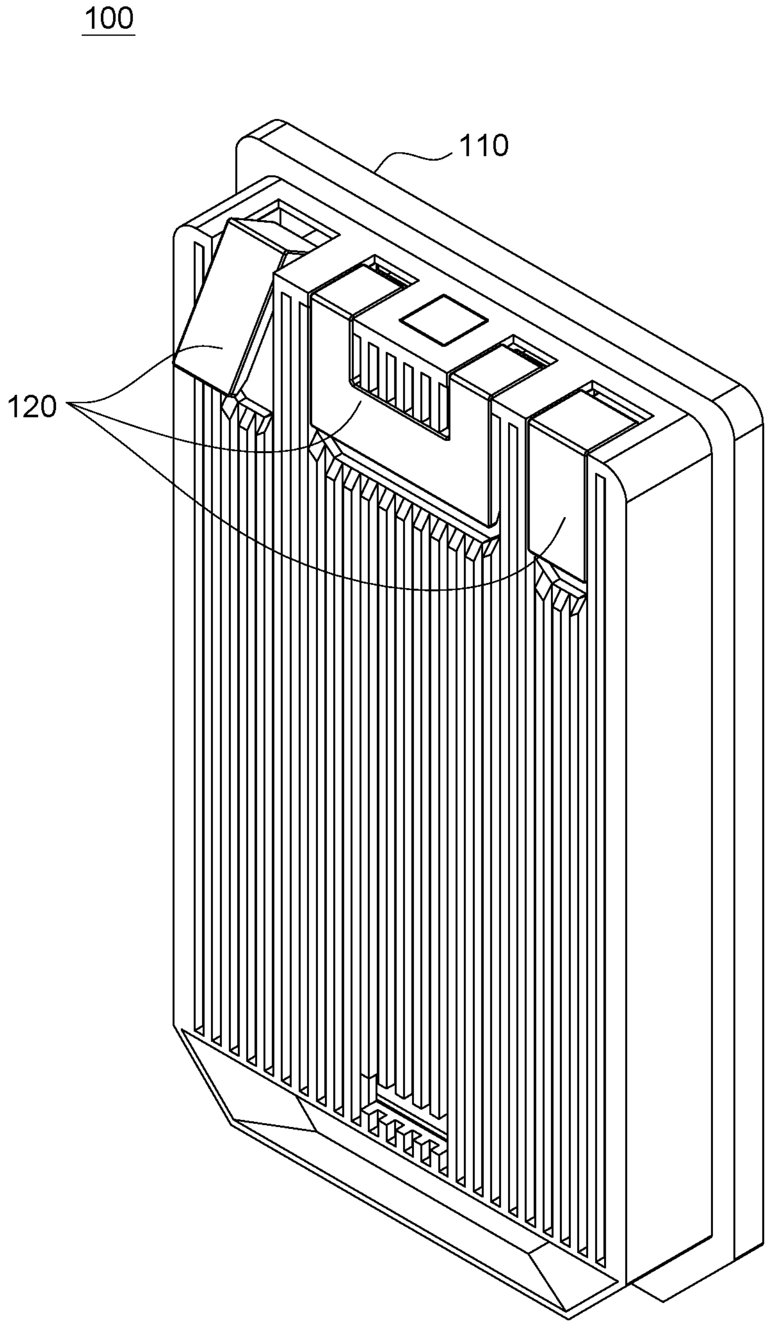
Figure 1C:
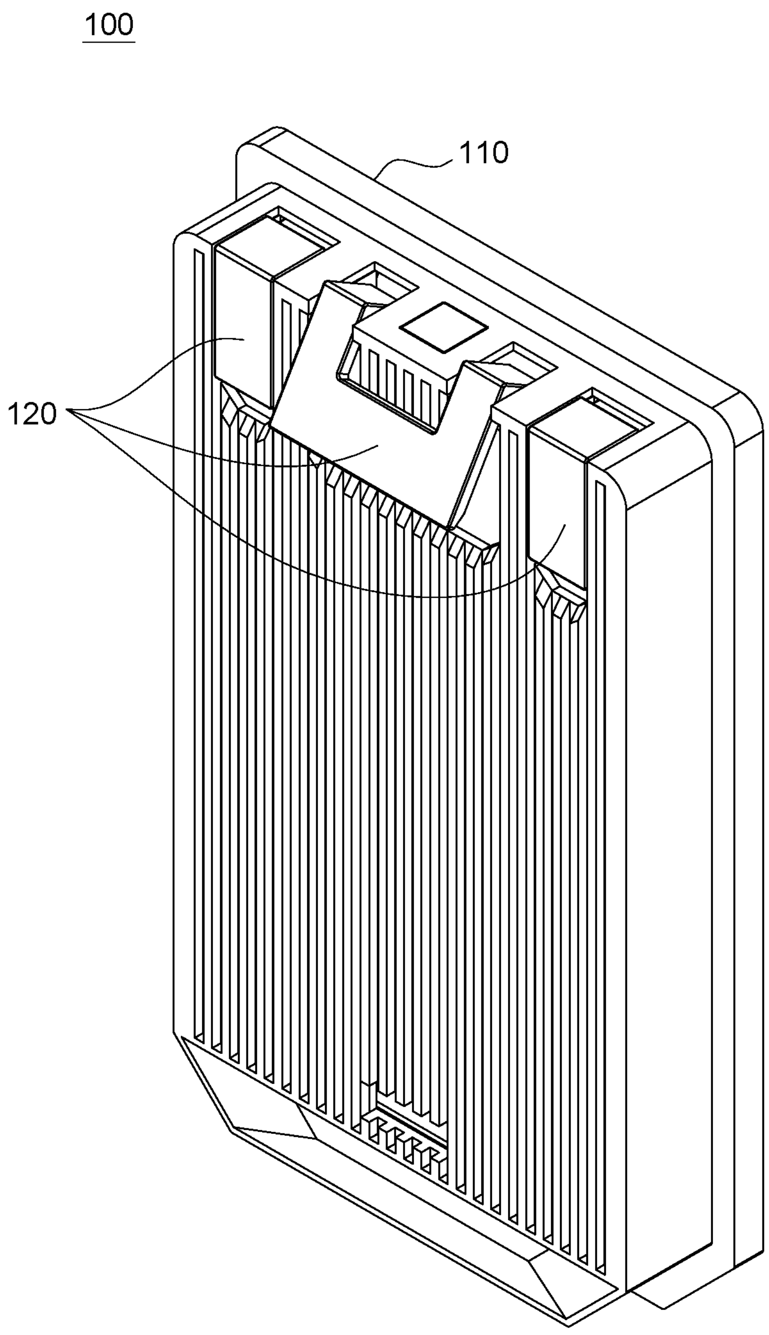
Figure 2A:
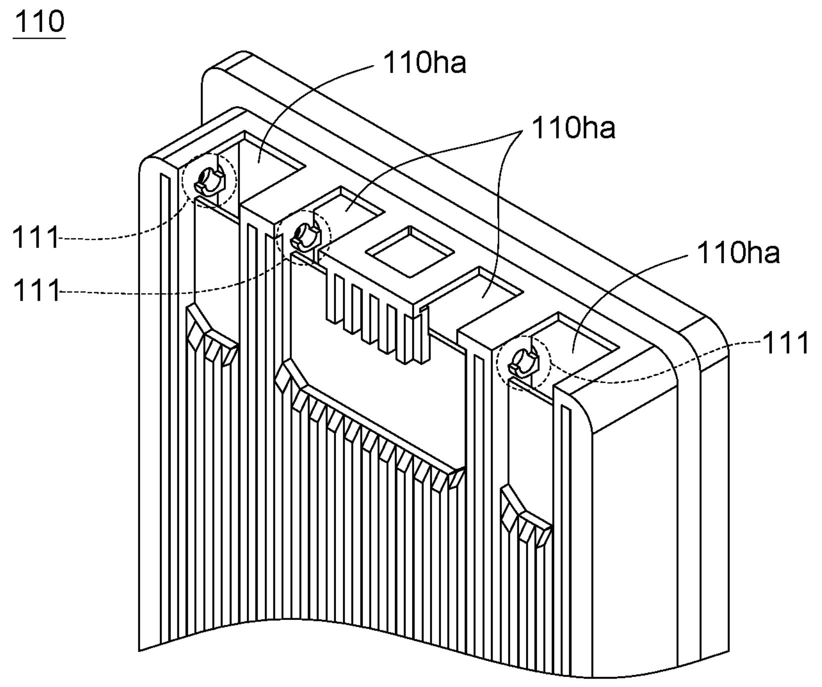
FIG. 2A is a partial schematic diagram of a bezel body of a casing assembly according to an embodiment of the present disclosure.
Figure 2B:
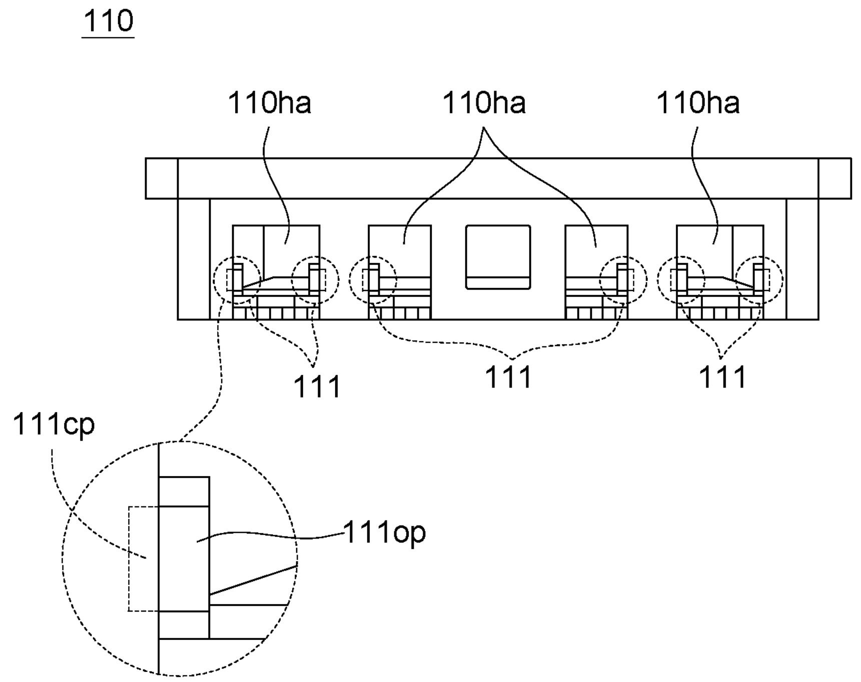
FIG. 2B is a top view of a bezel body of a casing assembly according to an embodiment of the present disclosure.
Figure 3:
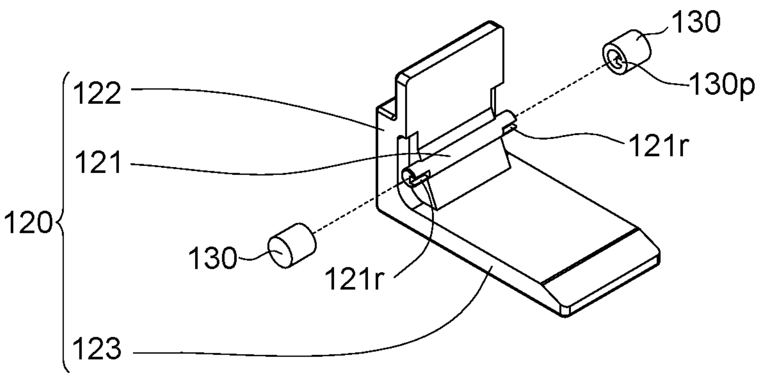
FIG. 3 is a schematic diagram of the movable component and two collar components of a casing assembly according to an embodiment of the present disclosure.
Figure 4A:
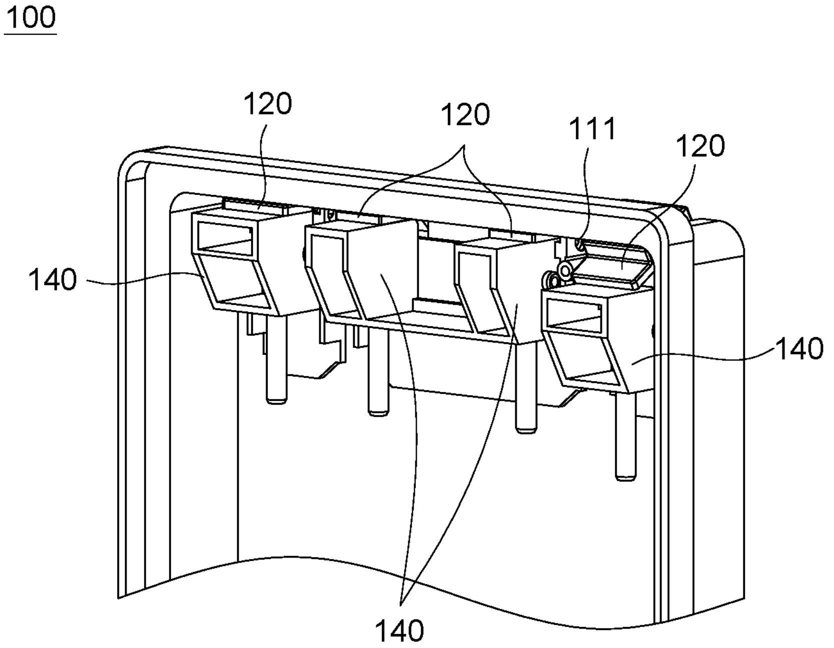
FIG. 4A to FIG. 4B are schematic diagrams of the arrangement on an inner side of a bezel body of a casing assembly according to an embodiment of the present disclosure.
Figure 4B:
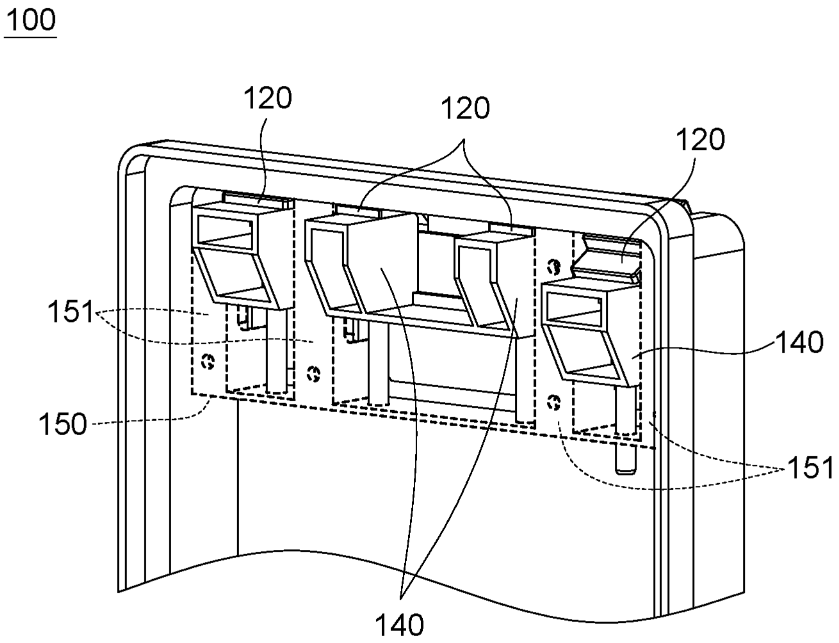

Refer to FIGS. 1A, 1B, 1C, 2A, 2B, 3, 4A and 4B. FIG. 1A to FIG. 1C are schematic diagrams of a casing assembly 100 according to an embodiment of the present disclosure. FIG. 2A is a partial schematic diagram of a bezel body 110 of a casing assembly 100 according to an embodiment of the present disclosure. FIG. 2B is a top view of a bezel body 110 of a casing assembly 100 according to an embodiment of the present disclosure. FIG. 3 is a schematic diagram of the movable component 120 and two collar components 130 of a casing assembly 100 according to an embodiment of the present disclosure. FIG. 4A to FIG. 4B are schematic diagrams of the arrangement on an inner side of a bezel body 110 of a casing assembly 100 according to an embodiment of the present disclosure.

The casing assembly 100 includes a bezel body 110, a movable component 120 and two collar components 130. The casing assembly 100, such as a part of a desktop computer case, can be realized as a bezel of a desktop computer case. As indicated in FIG. 1A to FIG. 1C, the movable component 120 can pivotally rotate with respect to the bezel body 110 to trigger other elements on the inner side of the bezel body 110 to actuate. In the present embodiment, the movable component 120 can be designed as two implementations as indicated in FIG. 1A to FIG. 1C. In one implementation, the lateral side is a single strip. In another implementation, the lateral side is formed of two strips connected in a U shape. As indicated in FIG. 1B to FIG. 1C, each of the movable components 120 can independently and pivotally rotate with respect to the bezel body 110 and does not have to be synchronized.

As indicated in FIG. 2A to FIG. 2B, the bezel body 110 includes at least one pair of hole structures 111. In the present embodiment, it is exemplified that there are three pairs of hole structures 111, but the quantity of hole structures 111 can be adjusted according to actual needs. The hole structures 111 can be used as a positioning base of pivotal rotation for receiving the movable component 120. Each of the hole structures 111 includes a closed hole portion 111*cp* and an open hole portion 111*op*. The closed hole portion 111*cp* and the open hole portion 111*op* are connected 20) along an axial direction, such as the axial direction of the pivotal rotation performed by the movable component 120. That is, the hole structures 111 have plural holes. As indicated in FIG. 2A, the closed hole portion 111*cp* can be realized by a circular hole, and the open hole portion 111*op* can be realized by a semi-circular hole. The closed hole portion 111*cp* and the open hole portion 111*op* provide a larger space for assembly or detachment operation, so that the movable component 120 can be toollessly arranged in the hole structures 111 of the bezel body 110.

As indicated in FIG. 2A, the open hole portion 111*op* is visible in the hollowed area 110*ha* of the bezel body 110, that is, it is protruded from the side wall of the hollowed area 110*ha* of the bezel body 110. Relatively, the closed hole portion 111*cp* is embedded into the side wall of the hollowed area 110*ha* of the bezel body 110. As indicated in FIG. 2B, at an overlooking angle, the closed hole portion 111*cp* is invisible in the hollowed area 110*ha* of the bezel body 110, and is illustrated in dotted lines in FIG. 2B.

Furthermore, the closed hole portion 111*cp* and the open hole portion 111*op* of one hole structure of each pair of hole structures 111 are symmetric with the closed hole portion 111*cp* and the open hole portion 111*op* of the other hole structure of each pair of hole structures 111. As indicated in FIG. 2B, the hole structures of each pair of hole structures 111 arranged in the left-hand side, the middle, and the right-hand side are symmetric with each other. Such symmetric arrangement can assure that the movable component 120 can be directly arranged in two open hole portions 111*op* of one pair of hole structures 111 without being compressed or deformed, so that the movable component 120 can be toollessly arranged in the hole structures 111 of the bezel body 110.

As indicated in FIG. 3, the movable component 120 is provided with a shaft portion 121, and two collar components 130 can be mounted on two opposite ends of the shaft portion 121. The shape of the two collar components 130 is adapted to that of one pair of hole structures 111 of FIG. 2A to FIG. 2B. The movable component 120 is pivotally arranged in the pair of hole structures 111 through two collar components 130. The movable component 120 and the two collar components 130 are made of different materials. For instance, the movable component 120 is made of metal, and the two collar components 130 are made of plastics. The bezel body 110 can be made of plastics and the material bezel body 110 of the can be identical to or different from that of the two collar components 130.

When the movable component 120 pivotally rotates with respect to the bezel body 110, the two collar components 130 can rotate along with the shaft portion 121. The two collar components 130 can provide a bushing effect to avoid the movable component 120 directly generating friction with the bezel body 110. Specifically, the two plastic collar components 130 replace the metal movable component 120 in the friction with the plastic bezel body 110, hence avoiding the problem of generating friction between two elements with different levels of hardness and increasing the stability in the pivotal structure of the 20) casing assembly 100.

As indicated in FIG. 3, the movable component 120 is further provided with a handle portion 122 and a trigger portion 123. The shaft portion 121 is connected between the handle portion 122 and the trigger portion 123, and the movable component 120 is an L-shaped three-dimensional structure. Selectively but not restrictively, the shaft portion 121, the handle portion 122 and the trigger portion 123 can be integrated as the movable component 120 in one piece. For instance, the movable component 120 can be formed of metal in one piece. Refer to FIGS. 1A, 1B, 2A and 3. The movable component 120 is for the user to trigger the actuation of other elements. When the handle portion 122 is actuated to pivotally rotate the shaft portion 121 in the hole structures 111, the trigger portion 123 moves in the hollowed area 110*ha* of the bezel body 110 to trigger other elements on the inner side of the bezel body 110 to actuate. For instance, the trigger portion 123 can trigger the function corresponding to the assembly or detachment of the casing.

As indicated in FIG. 3, each of the two opposite ends of the shaft portion 121 can be provided with a groove structure 121*r*, and each of the two collar components 130 can be provided with a protrusion structure 130*p* corresponding to the shape of the groove structure 121*r*, so that the two collar components 130 can be coupled to the groove structure 121*r* through the protrusion structure 130*p* to be mounted on the shaft portion 121, and the movable component 120 and the two collar components 130 can be more firmly assembled.

As indicated in FIG. 4A, the casing assembly 100 further includes a trigger 140. The trigger 140 and the movable component 120 are arranged on two opposite sides of the bezel body 110. That is, the trigger 140 is arranged on the inner side of the bezel body 110, and the movable component 120 with which the user perform touch control is arranged on the outer side of the bezel body 110. As disclosed above, when the movable component 120 pivotally rotates in the hole structures 111, the movable component 120 can drive the trigger 140 to move in the bezel body 110. The trigger 140 can be used as a touch switch corresponding to the assembly and detachment of the casing.

As indicated in FIG. 4B, the casing assembly 100 further includes a cover 150 (illustrated in dotted lines for highlighting). The cover 150 and the movable component 120 are arranged on two opposite sides of the bezel body 110. Like the arrangement of the trigger 140, the cover 150 is arranged on the inner side of the bezel body 110. For instance, the cover 150 is fixed on the bezel body 110 by way of locking. The cover 150 includes at least one pair of stopping structures 151. The stopping structures 151 are respectively fixed on one side of the hole structures 111 to stop the two collar components 130 and the shaft portion 121, hence avoiding the assembly of the two collar components 130 and the shaft portion 121 being displaced in the hole structures 111. That is, the cover 150 provides a positioning function for the movable component 120 and the two collar components 130 to be assembled in the bezel body 110, so that the pivotal structure of the casing assembly 100 can rotate more stably.

While the invention has been described by way of example and in terms of the preferred embodiment(s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A casing assembly, comprising:

a bezel body, including at least one pair of hole structures, wherein each of the hole structures includes a closed hole portion and an open hole portion, the closed hole portion and the open hole portion are connected along an axial direction, the open hole portion can be regarded as a hollowed area of the bezel body, the closed hole portion is a circular hole, and the open hole portion is a semi-circular hole;

a movable component provided with a shaft portion; and two collar components mounted on two opposite ends of the shaft portion, wherein the shape of the two collar components is adapted to that of the at least one pair of hole structures;

wherein, the movable component is pivotally arranged in the at least one pair of hole structures through the two collar components, and the movable component and the two collar components are made of different materials.

2. The casing assembly according to claim 1, wherein the closed hole portion and the open hole portion of one hole structure of the at least one pair of hole structures are symmetric with the closed hole portion and the open hole portion of the other hole structure of the at least one pair of hole structures.

3. The casing assembly according to claim 1, wherein the movable component is provided with a handle portion and a trigger portion, the shaft portion is connected between the handle portion and the trigger portion, and when the handle portion is actuated to pivotally rotate the shaft portion in the at least one pair of hole structures, the trigger portion moves in a hollowed area of the bezel body.

4. The casing assembly according to claim 3, wherein the shaft portion, the handle portion and the trigger portion integrally form the movable component in one piece.

5. The casing assembly according to claim 1, wherein each of the two opposite ends of the shaft portion is provided with a groove structure, each of the two collar components is provided with a protrusion structure corresponding to the shape of the groove structure, and the two collar components are coupled to the groove structure through the protrusion structure to be mounted on the shaft portion.

6. The casing assembly according to claim 1, wherein the movable component is made of metal, and the two collar components and the bezel body are made of plastics.

7. The casing assembly according to claim 1, further comprising:

a trigger, wherein the trigger and the movable component are arranged on two opposite sides of the bezel body, and when the movable component pivotally rotates in the at least one pair of hole structures, the movable component drives the trigger to move in the bezel body.

8. The casing assembly according to claim 1, further comprising:

a cover, wherein the cover and the movable component are arranged on two opposite sides of the bezel body, and the cover includes at least one pair of stopping structures respectively fixed on one side of the at least one pair of hole structures.

* * * * *